United States Patent
Morellec et al.

(10) Patent No.: US 10,407,180 B2
(45) Date of Patent: Sep. 10, 2019

(54) INTERFACE SYSTEM BETWEEN A USER AND A DISPLAY DEVICE IN THE COCKPIT OF AN AIRCRAFT, RELATED AIRCRAFT AND METHOD

(71) Applicant: DASSAULT AVIATION, Paris (FR)

(72) Inventors: Olivier Morellec, Saint Aubin (FR); Philippe Vorms, Noisy le Roi (FR); Maxime Philbert, Courbevoie (FR)

(73) Assignee: DASSAULT AVIATION, Paris (FR)

( * ) Notice: Subject to any disclaimer, the term of this patent is extended or adjusted under 35 U.S.C. 154(b) by 189 days.

(21) Appl. No.: 15/364,925

(22) Filed: Nov. 30, 2016

(65) Prior Publication Data
US 2017/0152058 A1   Jun. 1, 2017

(30) Foreign Application Priority Data

Dec. 1, 2015  (FR) ...................................... 15 02501

(51) Int. Cl.
*B64D 45/00* (2006.01)
*B64D 43/00* (2006.01)
*G06F 3/01* (2006.01)
*G06F 3/0482* (2013.01)
*G06F 3/0362* (2013.01)
*G08B 6/00* (2006.01)

(52) U.S. Cl.
CPC ............ *B64D 45/00* (2013.01); *B64D 43/00* (2013.01); *G06F 3/016* (2013.01); *G06F 3/0362* (2013.01); *G06F 3/0482* (2013.01); *G08B 6/00* (2013.01)

(58) Field of Classification Search
CPC .......... B64D 45/00; B64D 43/00; G08B 6/00; G06F 3/016; G06F 3/0362; G06F 3/0482
See application file for complete search history.

(56) References Cited

U.S. PATENT DOCUMENTS

| | | | | |
|---|---|---|---|---|
| 5,490,783 A | * | 2/1996 | Stephens | G09B 9/16 434/29 |
| 5,825,308 A | * | 10/1998 | Rosenberg | G05G 9/047 341/20 |
| 6,252,579 B1 | * | 6/2001 | Rosenberg | G06F 3/016 345/157 |
| 6,404,420 B1 | * | 6/2002 | Klein | G01C 21/3664 345/184 |

(Continued)

OTHER PUBLICATIONS

French Search Report for priority application.

*Primary Examiner* — Joseph H Feild
*Assistant Examiner* — Rufus C Point
(74) *Attorney, Agent, or Firm* — Davidson, Davidson & Kappel, LLC

(57) ABSTRACT

An interface system between a user and a display device in the cockpit of an aircraft, related aircraft and method are provided. The system includes a rotary controller configured to control a target on the display device; a target manager, controlled by the rotary controller for moving the target on the display device during the rotation of the rotary controller and/or for interacting with a field targeted by the target during the rotation of the rotary controller; a haptic feedback generator on the rotary controller during its rotation. The haptic feedback generator is configured to generate at least two distinct haptic profiles on the rotary controller depending on distinct system states and/or distinct man-machine interface states of the aircraft.

20 Claims, 5 Drawing Sheets

(56) References Cited

U.S. PATENT DOCUMENTS

| | | | | |
|---|---|---|---|---|
| 6,769,320 B1* | 8/2004 | Bollgohn | | B60K 35/00 |
| | | | | 200/5 R |
| 7,321,318 B2* | 1/2008 | Crane | | G01C 23/005 |
| | | | | 340/971 |
| 8,264,378 B1* | 9/2012 | Martins | | G01C 23/00 |
| | | | | 340/684 |
| 2001/0002126 A1* | 5/2001 | Rosenberg | | A63F 13/06 |
| | | | | 345/156 |
| 2003/0132860 A1* | 7/2003 | Feyereisen | | G01C 23/00 |
| | | | | 340/973 |
| 2005/0231489 A1 | 10/2005 | Ladouceur et al. | | |
| 2006/0160049 A1* | 7/2006 | Zora | | G09B 9/28 |
| | | | | 434/29 |
| 2006/0190843 A1* | 8/2006 | Takashima | | G01C 21/3664 |
| | | | | 715/810 |
| 2007/0057842 A1* | 3/2007 | Coleman | | H01Q 3/02 |
| | | | | 342/359 |
| 2007/0279401 A1* | 12/2007 | Ramstein | | G06F 3/016 |
| | | | | 345/184 |
| 2009/0174682 A1* | 7/2009 | Bowden | | B60K 35/00 |
| | | | | 345/173 |
| 2014/0035736 A1* | 2/2014 | Weddle | | G05D 1/005 |
| | | | | 340/407.2 |
| 2014/0240147 A1* | 8/2014 | Goda | | B64D 1/16 |
| | | | | 340/945 |
| 2014/0347176 A1* | 11/2014 | Modarres | | G06F 3/016 |
| | | | | 340/407.1 |
| 2015/0097786 A1* | 4/2015 | Behles | | G06F 3/041 |
| | | | | 345/173 |
| 2015/0116345 A1 | 4/2015 | Shoup et al. | | |
| 2015/0199012 A1 | 7/2015 | Palmer | | |
| 2016/0093230 A1* | 3/2016 | Boggs | | G09B 9/302 |
| | | | | 434/38 |
| 2016/0124509 A1* | 5/2016 | Garvis | | G06F 3/016 |
| | | | | 345/173 |
| 2016/0132134 A1* | 5/2016 | Dreyer | | B64C 19/00 |
| | | | | 345/184 |
| 2016/0257305 A1* | 9/2016 | Riviere-Cazaux | | B60W 50/14 |
| 2017/0355382 A1* | 12/2017 | Wang | | B60Q 3/82 |

* cited by examiner

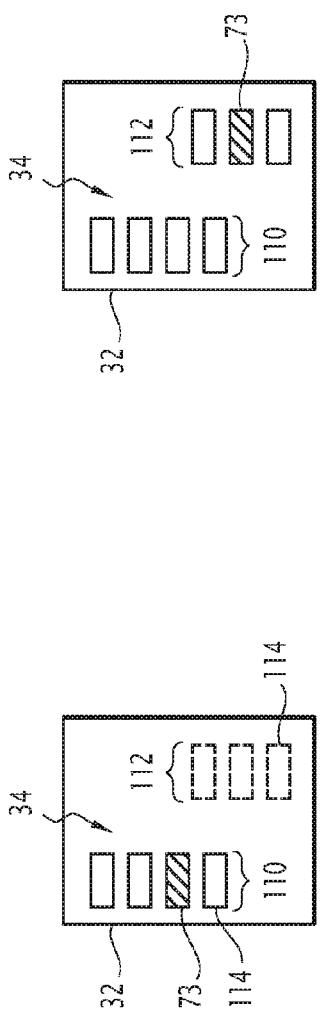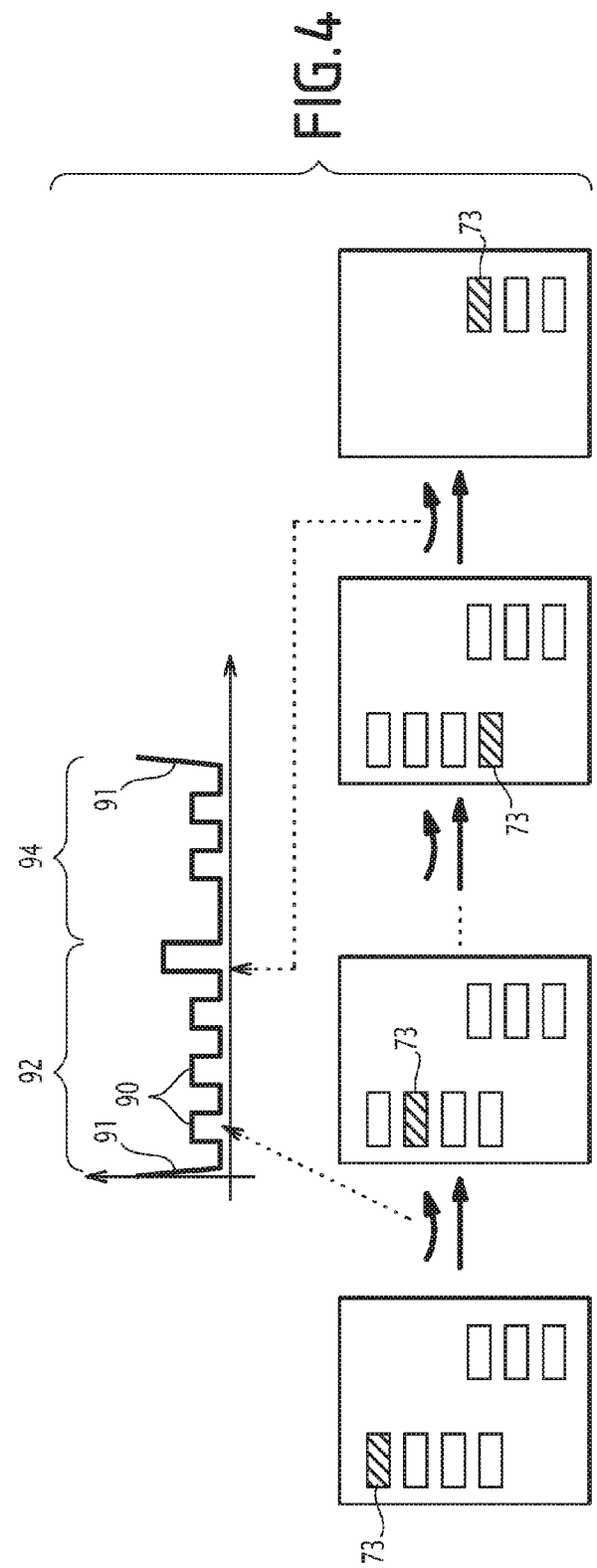

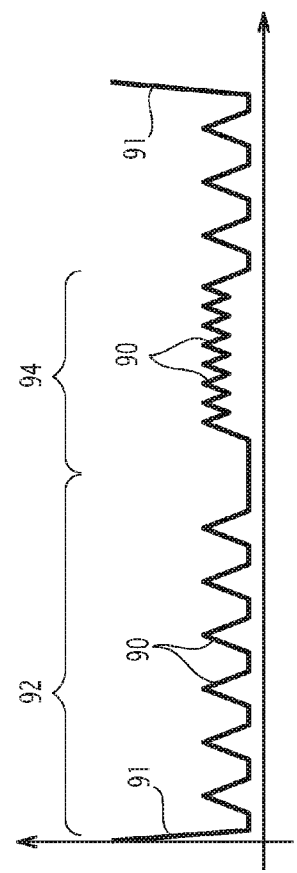
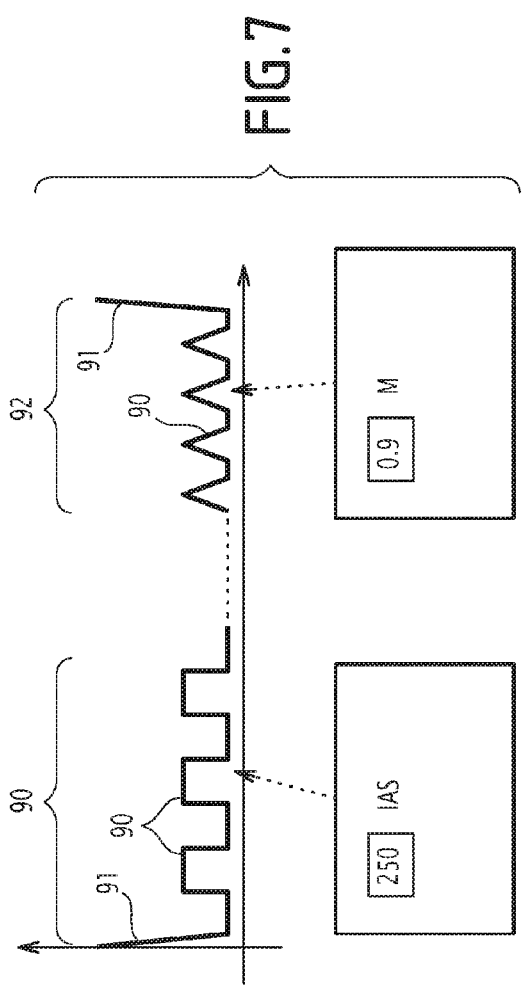

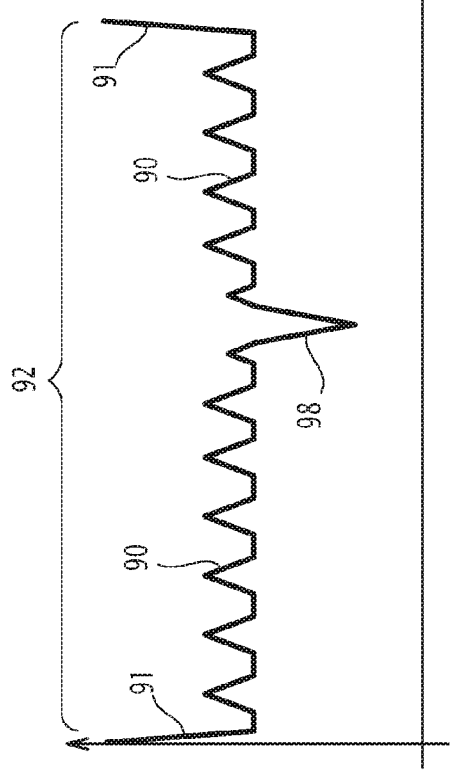
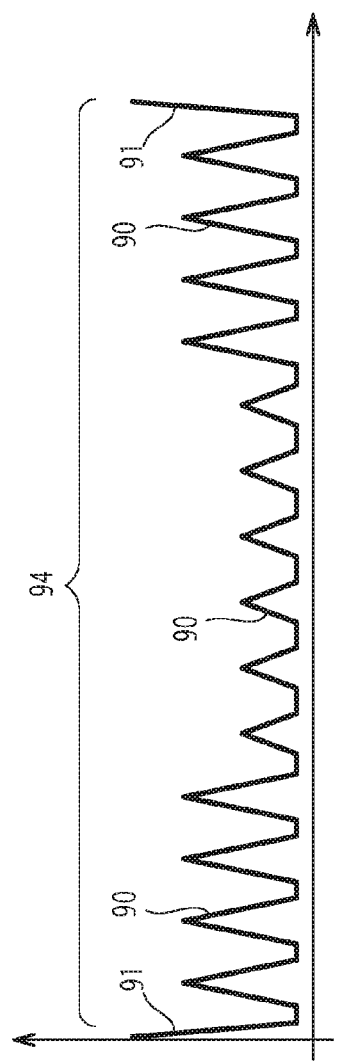

INTERFACE SYSTEM BETWEEN A USER AND A DISPLAY DEVICE IN THE COCKPIT OF AN AIRCRAFT, RELATED AIRCRAFT AND METHOD

This claims the benefit of French Patent Application FR 15 02501, filed Dec. 1, 2015 and hereby incorporated by reference herein.

The present invention relates to an interface system between a user and a display device in the cockpit of an aircraft, comprising:
- a rotary member able to control a target on the display device;
- a target management assembly, controlled by the rotary member for displacing the target on the display device during the rotation of the rotary member and/or for interacting with a field targeted by the target during the rotation of the rotary member;
- a haptic feedback generator on the rotary member during its rotation.

Conducting a flight on an aircraft involves controlling the aircraft, conducting the navigation of the aircraft, managing the communications between the outside world and the systems of the aircraft.

These operations are carried out by the crew, from a cockpit loaded onboard the aircraft, or located in a ground station, in the case of drones.

BACKGROUND

The cockpit generally includes a display device provided with screens, and many physical and/or software interfaces giving the possibility of interacting with the systems of the aircraft.

These interfaces notably include control buttons, keyboards, rotary control members, which are for example positioned on the console located between the members of the crew, on a panel located above the display screens, under the windshield.

Certain interfaces comprising a rotary member are able to control directly or indirectly menus or/and input fields of the display device, in order to navigate between the fields on the screens, to adjust the parameters, to enter instructions, or to actuate avionic systems.

The rotation of the rotary member is carried out with a constant torque which may be felt by the user. The user is therefore unable to easily perceive where he/she is located on the screens of the display device, what type of airplane parameter is being adjusted by him/her, or what are the consequences of the actuation of an airplane system.

The user therefore must carefully track the consequences of the rotation of the rotary member, and determine by means of his/her perception what is the state of the systems of the airplane, in order to appreciate the consequences of his/her action. This consumes time for the user, and requires the attention of the user while it may be used for other purposes.

Further, in certain cases, the actuation of the rotary member on a particular field may act in a totally different way on the aircraft, notably depending on the selective adjustment for actuating the field.

For example, the consequences of a set value applied to a rate of descent, may notably vary depending on the selected type of descent mode, for example a slope in degrees, or a descent rate in feet per second.

This may have significant consequences on the conduction of the flight, notably if the user believes that he/she is in a first descent mode, while a second descent mode has been selected.

U.S. 2015/0081137 discloses an interface system of the aforementioned type, wherein a haptic feedback is provided to the user for improving the interaction with the system.

The interface system described in this document describes a single haptic profile in which the resistance provided to the user increases in the vicinity of a given set value which has to be inputted by the user.

SUMMARY OF THE INVENTION

An object of the invention is to provide an interface system further improving the interaction between the user and the display device, which allows the user to better apprehend the current configuration the aircraft.

For this purpose, a system of the aforementioned type is provided in which the haptic feedback generator is able to generate at least two distinct haptic profiles on the rotary member depending on distinct system states and/or distinct man-machine interface states of the aircraft.

The system according to the invention may comprise one or several of the following features, taken individually or according to any technically possible combination:
- the haptic feedback generator is a torque generator, able to be applied on the rotary member, a torque according to the haptic profile generated during the rotation of the rotary member by the user;
- the haptic feedback generator is able to generate distinct haptic profiles on the rotary member during the interaction with a same field targeted by the target, depending on the system states and/or on the man-machine interface states of the aircraft;
- the haptic feedback generator is able to generate distinct haptic profiles on the rotary member during the control of two distinct targeted fields, depending on the system states and/or the man-machine interface states of the aircraft;
- the distinct man-machine interface states include distinct input interface states which comprise distinct speeds of rotation of the rotary member, the haptic feedback generator being able to generate a first haptic profile to a first speed of rotation of the rotary member and a second distinct haptic profile from the first haptic profile to a second speed of rotation of the rotary member;
- the distinct man-machine interface states include distinct graphic interface states which comprise positions of the target on successive lists of fields on the display screen, the haptic feedback generator being able to generate a first haptic profile when the target targets a first list of fields and a second distinct haptic profile from the first haptic profile when the target targets a second list of fields;
- the distinct system states comprise distinct flight phases of the aircraft, the haptic feedback generator being able to generate a first haptic profile during a first flight phase of the aircraft, and of generating a second haptic profile during a second flight phase of the aircraft;
- the first flight phase is a low altitude transition, notably an ascent or an approach of the aircraft, the second flight phase being cruising of the aircraft;
- the distinct system states comprise a normal operating state of an airplane system and/or of the aircraft and a degraded operating state of an airplane system and/or of the aircraft, the haptic feedback generator being able to generate a first haptic profile in the normal operating state and being able to generate a second haptic profile in the degraded operating state;

the haptic profile comprises at least one wall defining a limit of a preferred domain of use of the rotary member;

each haptic profile comprises at least one notch, a first haptic profile comprising at least one first distinct notch from at least one second notch of a second haptic profile;

the first haptic profile comprises a first series of successive notches, the second haptic profile comprising a second series of successive notches of profiles and/or intensity distinct from the notches of the first series.

An assembly for controlling an aircraft is also provided, including:

a display device, positioned in the cockpit of the aircraft;

an interaction system as described above;

an avionic unit, able to interact with airplane systems, the interaction system being able to communicate with the avionics unit in order to determine the system states and/or current man-machine interface states of the aircraft.

A method for interaction between a user and a display device of an aircraft is also provided, comprising the following steps:

providing an interaction system as described above;

in a first system and/or man-machine interface state of the aircraft, driving into rotation the rotary member by a user, the haptic feedback generator generating a first haptic profile on the rotary member;

in a second system and/or man-machine interface state of the aircraft, driving into rotation the rotary member by a user, the haptic feedback generator generating a second haptic profile on the rotary member.

The method according to the invention may comprise one or several of the following features, taken individually or according to any technically possible combination:

the steps of driving into rotation of the rotary member by a user in the first system and/or man-machine interface state of the aircraft and in the second system and/or man-machine interface state of the aircraft cause interaction of the target with the same field on the display device.

BRIEF SUMMARY OF THE DRAWINGS

The invention will be better understood upon reading the description which follows, exclusively given as an example, and made with reference to the appended drawings, wherein:

FIG. 2 is a view of a window for selecting fields, in a first graphic interface state corresponding to the navigation among a first list of fields by means of the rotary member;

FIG. 3 is a similar view to FIG. 2 in a second graphic interface state, corresponding to the navigation among a second list of fields selected from the first list of fields by means of the rotary member;

FIG. 4 is a diagram illustrating the distinct haptic profiles respectively generated in the first graphic interface state and in the second graphic interface state;

FIG. 5 is a view of a window for adjusting a set value, able to be activated by means of the interface system according to an embodiment of the invention;

FIG. 6 illustrates the different distinct haptic profiles respectively generated in a first man-machine interface state corresponding to the rotation of the rotary member at a first speed of rotation and in a second state of the man-machine interface corresponding to the rotation of the rotary member at a second speed of rotation ;

FIG. 7 is a view illustrating the different haptic profiles respectively generated in a first state of the man-machine interface corresponding to the input of a set value of a flight parameter in a first input mode and in a second set of the man-machine interface corresponding to the input of a set value of the flight parameter in a second input mode;

FIGS. 11 and 12 describe two distinct haptic profiles corresponding to the input of set values for two distinct flight parameters.

DETAILED DESCRIPTION

Figure 1:
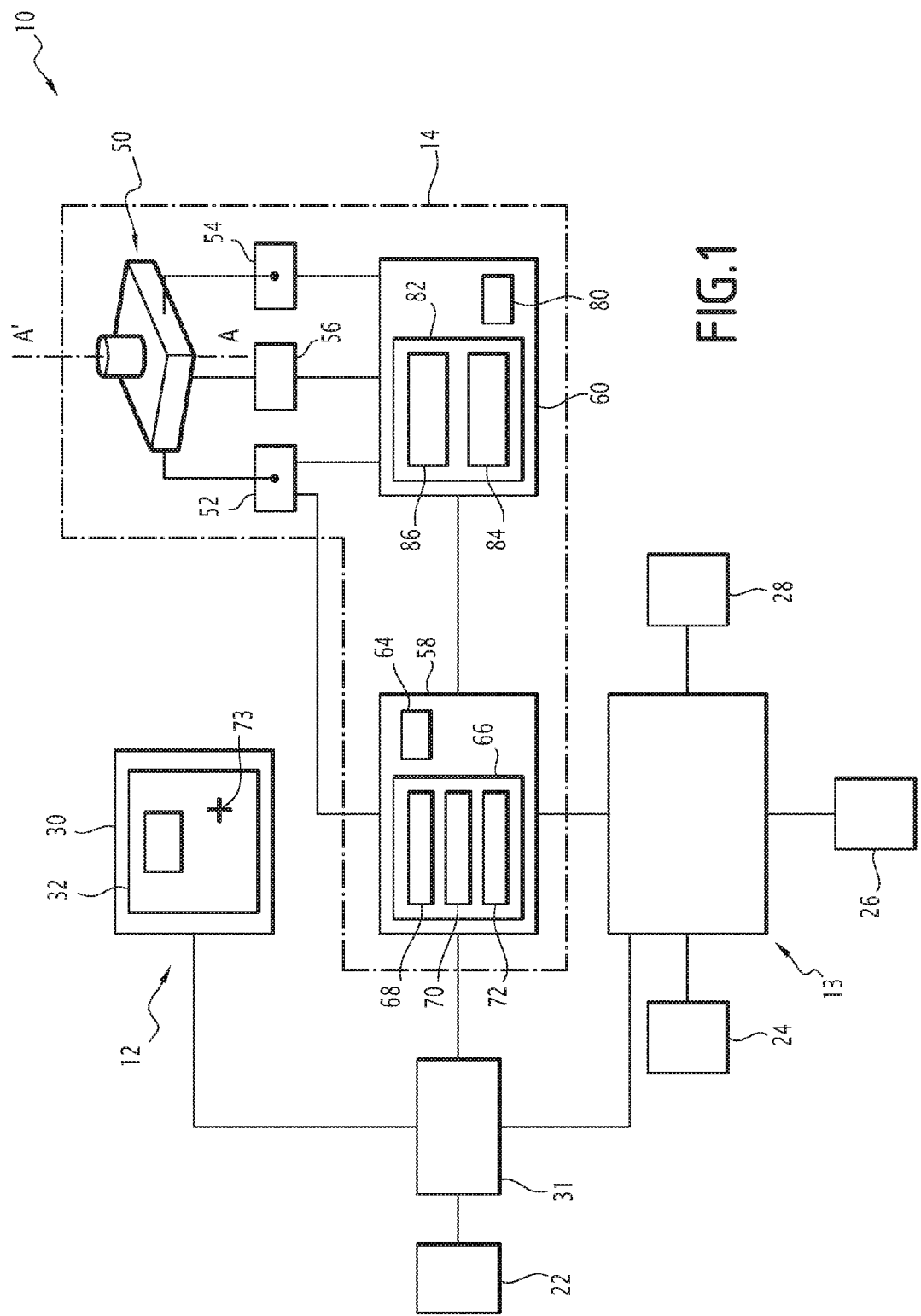
FIG. 1 is a schematic view of a first assembly for controlling an aircraft comprising an interface system according to an embodiment of the invention equipped with a rotary member and a haptic feedback generator on the rotary member.

A first aircraft control set 10 is schematically illustrated in FIG. 1.

The set 10 includes a display device 12, a central avionics unit 13 and an interface system 14 between a user and the display device 12.

The central avionics unit 13 is notably connected to airplane systems, notably measurement systems 24 on the aircraft, to outer communication systems 26, and to systems 28 for actuating controls of the aircraft.

The measurement systems 24 for example include sensors for measuring parameters external to the aircraft, such as temperature, pressure or speed, sensors for measuring internal parameters to the aircraft and to its different functional systems and positioning sensors such as GPS sensors, inertial measurement systems, and/or an altimeter.

The outer communication systems 26 for example include radio systems VOR/LOC, ADS, DME, ILS, NLS, or/and radar systems.

The control systems 28 include specific actuators for actuating controls of the aircraft, such as flaps, rudders, pumps, or further mechanical, electrical and/or hydraulic circuits, and software actuators able to configure the avionic states of the aircraft.

The different systems 24 to 28 are connected to the central control unit 13, for example digitally, through at least one data bus circulating on a network internal to the aircraft.

The avionic central unit 13 includes at least one computer and a memory able to receive the pieces of information from the different systems 24 to 28 and to process them, and optionally control the systems 28 for executing flight commands.

The display unit 12 is preferably placed in the cockpit of the aircraft. It includes at least one display area 30.

The display unit 12 further includes a display management assembly 31 able to control the display on said or each display area 30.

Conventionally, display areas 30 are generally defined on primary display screens, located facing the seat of each respective crew member, on a multifunctional navigation screen and/or on a control and tracking screen of avionic systems.

The display on each display area 30 is controlled by the display management assembly 31.

The display management assembly 31 is connected to the avionics central control unit 13 for receiving data from the different systems 24, 26, 28 of the airplane.

It includes a processor, and a memory comprising at least one software application for displaying windows 32 on the display area 30, able to be executed by the processor.

The windows 32 are for example flight parameter windows, navigation windows, communication windows, and/or airplane system management windows.

The windows 32 are for example frames in which are displayed graphic elements. They occupy all or part of the display area 30 in which they are intended to be displayed.

The windows 32 comprise graphic elements, with which the user is able to interact, notably by means of the interface system 14.

With reference to FIGS. 2 and 3, the graphic elements comprise for example menus 34 which may be actuated by the user, for example by selecting a field of the menu by means of the interface system 14, in order to navigate in a tree structure comprising lists of fields.

The navigation notably gives the possibility of showing other windows, and/or of unfolding a procedure.

In the example of FIG. 5, the graphic elements advantageously comprise alphanumerical data input fields 36 by means of the interface system 14, notably for inputting a set value applied on a parameter of the aircraft.

The set values are for example control set values given to an automatic pilot or to an automatic lever, for modifying a flight parameter such as a course, a rate of descent, an engine speed.

Alternatively, the set value is a navigation set value, such as a flight plan set value or for controlling the direction of the aircraft towards a given geographical point.

Still alternatively, the set value is an outer communication set value for example a change in radiofrequency.

Figure 8:
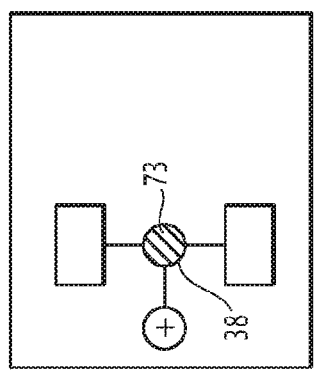
FIG. 8 is a schematic view of a control block diagram of a component of an airplane system.

In the example of FIG. 8, the graphic elements include controls 38 which may be actuated by the user, by means of the interface system 14, notably for controlling or tracking an airplane system.

In particular, the control is an instruction for opening or closing pumps, actuators, mechanical, electrical and/or hydraulic circuits.

With reference to FIG. 1, the interface system 14 comprises at least one rotary member 50 for controlling a target on the display device 12, sensors 52, 54 respectively for angular displacement and for torque applied on the rotary member 50, and a torque generator 56, advantageously formed by the torque sensor 54.

By «controlling a target», is notably meant that the rotary member is able to displace a target or «focus» within different fields of a tree structure of a graphic interface, or causing a change in the numerical or logical value of a particular field targeted by the target, in particular when the field is an input field.

The interface system 14 further includes a target management assembly 58 on the display device 12, controlled by the rotary member 50, and a haptic feedback generator 60 on the rotary member 50 during its rotation, able to generate distinct haptic profiles on the rotary button depending on distinct system states and/or distinct man-machine interface states of the aircraft, for controlling the torque generator 56.

The man-machine interface states notably comprise graphic interface states and input interface states.

In this example, the interface system 14 further advantageously comprises at least one man-machine interface 22 distinct from the rotary member 50.

The rotary member 50 is here formed by a rotary button or «rotator switch» around a unique axis A-A'. The angular displacement sensor 52 is able to determine at each instant the angular position of the rotary member 50 around the axis A-A'.

The torque sensor 54 is able to determine, at each instant, the torque applied on the rotary member 50 during its rotation around the axis A-A'.

The target management assembly 58 preferably comprises a processor 64 and a memory 66 containing software applications able to be executed by the processor.

The memory 66 notably contains a target management application 68, an application 70 for generating and displacing a target 73 on a window 32 of a display area 30 and a context management application 72, able to determine at least one present system and/or man-machine interface state of the aircraft, relevant towards the position of the target on the window 32.

The target management application 68 is able to receive the signals from the angular positioning sensor 52 for determining the position of a target 73 on the window 32, and the possible blocking of the target 73 on a field of menus, for inputting set values or for controlling the window 32, for the actuation of this field.

The generation and displacement application 70 for the target is able to receive the data from the target management application 68 and of generating the display of a target 73 at the position determined by means of the target management application 68 depending on the rotation of the rotary member 50 and on the possible blocking of the target 73 in a field.

The generation and displacement application 70 is able to transmit the target display data to the display management assembly 31.

The target 73 is for example materialized by a cursor as in FIG. 1, or by a particular display of a field, notably highlighting, like in FIG. 2 or 3.

The context management application 72 is able to receive the pieces of information of the position of the target 73 and of collecting the system state or man-machine interface state which are relevant towards this position, notably by interacting with the avionic unit 13.

The context management application 72 is able to transmit the system state and/or man-machine interface state data to the torque generator 60.

For example, when the target 73 moves in the lists of fields of menus, as illustrated in FIG. 2, the context management application 72 is able to determine the nature of the list in which moves the target 73, the number of fields of this list, and the particular fields of the list of fields giving the possibility of accessing other lists, or to other menus or to obtain man-machine interface state data, here corresponding relevant graphic interface state data.

When the target 73 is positioned in an input field, as illustrated in FIG. 5, the context management application 72 is able to determine the type of input field on which the target is positioned, and to obtain relevant system and/or man-machine interface state data relative to this input field.

The relevant data are for example data received from the rotary member 50, such as a speed of rotation of the sensor.

Alternatively or additionally, the relevant data are the input mode and/or the unit, into which the set value has to be inputted, the flight phase in which is found the aircraft, the targeted set value, and/or the preferential domain of the input values.

When the target is positioned on a control, as illustrated in FIG. 8, the context management application 72 is able to determine the type of control targeted by the target, and to obtain relevant data of the system and/or man-machine interface state relative to this control.

The relevant data of a system state are for example a normal operating state of the airplane system affected by the control and/or of the aircraft, or on the contrary a degraded operating state of the airplane system affected by the control and/or of the aircraft.

The torque generator 60 includes a processor 80 and a memory 82 containing software applications able to be executed by the processor 80.

The memory thus contains an application 84 for generating distinct haptic profiles 92, 94, according to the system and/or man-machine interface state received, and an application 86 for transmitting the haptic profile generated by the application 84 to the torque generator 56 of the rotary member 50.

Each haptic profile 92, 94 generated by the application 84 includes at least one notch 90, preferably a plurality of successive notches 90 visible in FIGS. 4, 6, 7, and 9 to 12. Each haptic profile 92, 94 advantageously comprises walls 91 of an intensity greater than that of the notches 90 for materializing the limits of an adequate rotation range of the rotary member 50.

The distinct haptic profiles 92, 94 for example have a number of different notches 90, and/or at least two notches 90 with different lengths, intensity and shape for materializing different system and/or graphic interface states.

For example, as illustrated by FIG. 4, a first profile 92 has a number of notches 90 distinct from a second profile 94, for example three notches of small intensity and a notch of stronger intensity for the first profile 92 and two notches of small intensity and a wall 91 for the second profile 94.

This materializes the number of fields of menus available in a list of fields 110, 112, the notch 90 with the strongest intensity materializing a field for passing to another list of fields.

In the example illustrated by FIG. 6, a first profile 92 has notches with a greater length and a smaller maximum intensity than the notches of a second profile 94, for materializing a different speed of rotation of the rotary member 50.

In the example illustrated by FIG. 7, the notches 90 of a first haptic profile 92 have a notch shape, different from the notches 90 of a second haptic profile 94 which have a triangular shape, for materializing a different input mode of parameters, or a different input scale.

Figure 9:
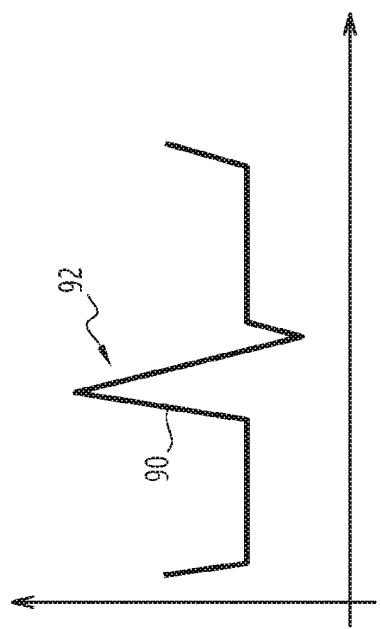
FIG. 9 is a view of a first haptic profile generated by the control of the component by means of the block diagram of FIG. 8, in a first system state corresponding to a wish of secured interaction.
Figure 10:
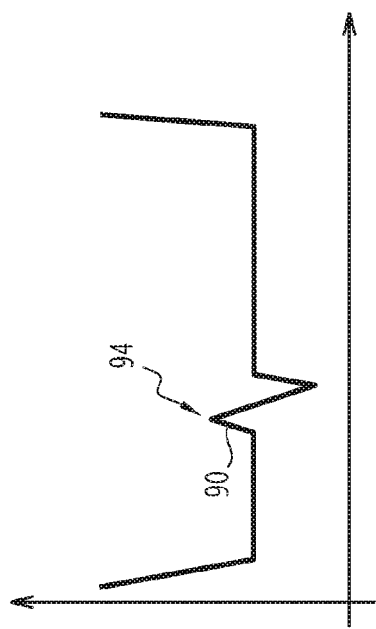
FIG. 10 is a view of a second haptic profile generated for the control of the same component by means of the block diagram of FIG. 8 in a second system state corresponding to a wish for inciting the interaction.

In the example illustrated in FIGS. 9 and 10, a first haptic profile 92 has a notch 90 with an intensity greater than that of the notch 90 of a second haptic profile 94, for materializing a difference in the operating state of an airplane system onto which a control has to be applied.

In the example illustrated in FIGS. 11 and 12, a first profile 92 has a first series of notches 90 and a second series of notches 90 surrounding a single recess 98, for materializing a specific target value intended to be inputted. A second haptic profile 94 includes two series of notches with greater intensity than an intermediate series materializing a range of preferred target values.

The distinct haptic profiles 92, 94 are generated by the generation application 84 depending on the system and/or graphic interface state data transmitted by the context management application 72.

The distinct haptic profiles 92, 94 are for example generated according to the display present on the display area 30, for example menus or fields available on the display area 30. They may be generated according to the type of action on the rotary member, for example on the speed of rotation of this rotary member 50.

Alternatively, the different haptic profiles are able to be generated according to the type of input, for example on the input mode and on the unit selected for the input.

Still alternatively, the different haptic profiles are generated according to the relevant flight phase, for example a rolling, take-off, cruising, or landing phase or further depending on operating states of the airplane systems, or on the aircraft, for example a normal operating state or a degraded operating state during a failure.

The transmission application 86 is able to express the haptic profile generated by the generation application 84 as an electric control signal of the torque generator 56 for applying the haptic profile to the rotary member 50 during its rotation, depending on the system and/or graphic interface state data.

The torque generator is able to generate a torque corresponding to the given haptic profile, during the rotation of the rotary member 50 by the user. This profile is expressed by variable travel and force to be produced by the user for overcoming the generated torque.

Examples of interaction methods between a user and a display device of an aircraft, applied by means of the system 14 will now be described.

In a first example, illustrated by FIGS. 2 to 4, the user actuates the rotary member 50 for navigating in the successive lists 110, 112 of fields.

Certain particular fields 114 of the list, here the last field of the list materialize an end of a list, a bottom of a page, a change of list and of windows.

During the actuation of the rotary member 50, the target management application 68 determines the position of the target 73 on the window 32, and transmits it to the application for generating and displacing the target 70 in order to generate the display of the target 73 on the window 32. In this example, the display of the target 73 is materialized by highlighting of the field selected by the user.

The context management application 72 determines in which list 110, 112 of fields is found the target 73 and provides graphic interface state data comprising the number of fields in the list, and the position of the particular fields 114 of the list to the application 84 for generating haptic profiles.

The application 84 for generating haptic profiles then generates a first haptic profile 92 comprising a number of notches 90 corresponding to the number of fields of the list 110, the intensity of the notch corresponding to a particular field 114 being greater than the intensity of the other notches.

The generated haptic profile 92 is transmitted to the torque generator 56 by the application for transmitting a profile 86.

At each passage between two fields, the torque generator 56 generates a torque corresponding to the defined notch 90 in the haptic profile 92.

When the user switches onto the second list 112, the context management application 72 detects the change in the graphic interface state and transmits the graphic interface state data comprising the number of fields in the second list 112 and the position of the particular fields 114 of the list to the application 84 for generating a haptic profile.

The application 84 for generating a haptic profile then generates a second haptic profile 94 distinct from the first haptic profile 92, by the number of small intensity notches.

The user easily perceives, depending on the haptic profile felt during the rotation, what is the number of fields available in the list 110, 112, and what are the particular fields 114, since the latter has to overcome a greater force in order to pass the notch generated by the haptic profile.

This improves the target displacements in the graphic interface, and facilitates the task of the crew.

In a second example illustrated by FIG. 5 and by FIG. 6, the user places the target on an input field 36 of a flight parameter, and modifies the set value associated with this flight parameter by rotating the rotary member 50.

Depending on the speed of rotation of the rotary member 50, rapid increments or slow increments of the set value are applied. For example, in the case of the adjustment of a set altitude, the slow increments are 100 feet, and the rapid increments are 1,000 feet.

The context management application 72 receives speed of rotation data of the rotary member 50 and provides man-machine interface state data, here input interface state data to the application for generating a haptic profile 84, depending on the speed of rotation of the rotary member 50.

In a first range of speeds of rotation of the rotary member 50, greater than a predetermined speed of rotation, the speed of rotation is considered as high, while in a second range of speeds of rotation, less than a predetermined speed of rotation, the speed of rotation is considered as slow.

When the speed of rotation is high, the context management application 72 transmits a man-machine interface state datum formed by an indication of a high speed of rotation to the application for generating a haptic profile 84.

A first haptic profile 92, consisting of small intensity notches 90 and with relatively large extents is then generated and is transmitted to the torque generator 56 by the application 86.

When the speed of rotation is low, the context management application 72 transmits a man-machine interface state datum formed by an indication of a low speed of rotation to the application for generating a haptic profile 84.

A second haptic profile 92 comprising notches with a stronger maximum intensity, but with smaller lengths, are then generated.

Moreover, the context management application 72 defines recommended minimum and maximum limits of the flight parameter and transmits these limits to the generation application 84 for materializing the limits by walls 91 in the haptic profile 92, 94.

Thus, the user may very simply determine at which speed the set value of the flight parameter is modified, and with which increment. This limits the risk of error and facilitates input.

A third example of application of the method is illustrated by FIG. 7. In this example, the user adjusts the same flight parameter, i.e. the speed. The user has two input modes for proceeding with the adjustment, for example a real speed (IAS) indicated in knots or as a Mach number.

The context management application 72 transmits to the application for generating a haptic profile 84 a man-machine interface state datum including an indication of the type of input mode and/or of scale selected for the parameter.

When the indication corresponds to a first type of scale, for example a real speed indicated in knots, the generation application 84 generates a first haptic profile 90 for example consisting of notch-shaped notches 90.

When the indication of the type of scale corresponds to a second type of scale, for example to a Mach number, the generation application 84 generates a second haptic profile 92, for example consisting of saw-tooth notches 90.

The transmission application 86 then transmits the haptic profile to the torque generator 56.

Then the user very easily perceives which is the type of selected scale, which limits the risk of an input error.

Alternatively, the flight parameter is an altitude, and the scales are given in feet or in flight levels. Still alternatively, the fight parameter is a speed of descent, and the scales are given as a slope or as a vertical speed.

Still alternatively, the type of scale for the input depends on the flight phase in which the aircraft is found. In this case, the context management application 72 transmits to the application for generating a haptic profile 84 system state data thus including data for identifying the flight phase, and the haptic profile 92, 94 is selected according to the flight phase.

In the fourth example, illustrated in FIG. 10, the user actuates a control 38 of an airplane system. In a normal state of the airplane system, or more generally of the aircraft, the control should not generally be activated, while in a failure procedure, corresponding to a degraded state of the airplane system or of the aircraft, the control may be executed or should be executed.

The context management application 72 is able to identify the operational state of the airplane system or of the aircraft, and to produce a system state datum corresponding to an indicator of the need for securing the interaction.

When the airplane system or the aircraft is in a normal operational state, the generation application 84 generates a first haptic profile 92 having a notch 90 with strong intensity, in order to dissuade the user from executing the command.

On the contrary, when the airplane system or the aircraft is in a degraded operating operational state, the generation application 84 generates a second haptic profile 94 having a notch 90 of small intensity suggesting to the user that he/she may carry out the command, or even that he/she should carry out the command.

FIGS. 11 and 12 illustrate two distinct haptic profiles 92, 94 which may be generated according to the type of inputted fight parameter type on two distinct input fields.

In the profile of FIG. 11, the fight parameter should be adjusted accurately to a set value. The first haptic profile 92 includes two series of notches 90 surrounding a recess 98 materializing the set value.

On the contrary, in the profile of FIG. 12, the fight parameter should be adjusted within a preferential range. The second haptic profile 94 thus includes a series of notches 90 with strong intensity surrounding a series of notches 90 of small intensity, materializing the preferential range.

What is claimed is:

1. An interface system between a user and a display of an aircraft, comprising:
   a rotary controller configured to control a target on the display;
   a target manager, controlled by the rotary controller for moving the target on the display during the rotation of the rotary controller and/or for interacting with a field targeted by the target during the rotation of the rotary controller;
   a haptic feedback generator on the rotary controller during its rotation, the haptic feedback generator being configured to generate at least two distinct haptic profiles on the rotary controller depending on distinct system states and/or distinct man-machine interface states of the aircraft, wherein the haptic feedback generator is configured to generate the at least two distinct haptic profiles on the rotary controller during the interaction with a same field targeted by the target, depending on the system states and/or man-machine interface states of the aircraft.

2. The system according to claim 1, wherein the haptic feedback generator is a torque generator, configured to apply on the rotary controller a torque according to the haptic profile generated during the rotation of the rotary controller by the user.

3. The system according to claim 1, wherein the haptic feedback generator is configured to generate distinct haptic profiles on the rotary controller during the control of two distinct targeted fields, depending on the system states and/or man-machine interface states of the aircraft.

4. The system according to claim 1, wherein the distinct man-machine interface states include distinct input interface states which comprise distinct speeds of rotation of the rotary controller, the haptic feedback generator being configured to generate a first haptic profile at a first speed of rotation of the rotary controller and a second haptic profile distinct from the first haptic profile at a second speed of rotation of the rotary controller.

5. The system according to claim 1, wherein the distinct man-machine interface states include distinct graphic interface states which comprise positions of the target on successive lists of fields on the display screen, the haptic feedback generator being configured to generate a first haptic profile when the target targets a first list of fields and a second haptic profile distinct from the first haptic profile when the target targets a second list of fields.

6. The system according to claim 1, wherein the distinct system states comprise distinct flight phases of the aircraft, the haptic feedback generator being configured to generate a first haptic profile during a first flight phase of the aircraft, and to generate a second haptic profile during a second flight phase of the aircraft.

7. The system according to claim 6, wherein the first flight phase is a low altitude transition, the second flight phase being a cruising of the aircraft.

8. The system according to claim 7, wherein the low altitude transition is an ascent or an approach of the aircraft.

9. The system according to claim 1, wherein the distinct system states comprise a normal operating state of an airplane system and/or of the aircraft and a degraded operating state of an airplane system and/or of the aircraft, the haptic feedback generator being configured to generate a first haptic profile in the normal operating state and being configured to generate a second haptic profile in the degraded operating state.

10. The system according to claim 1, wherein the haptic profile comprises at least one wall defining a limit of a preferred domain of use of the rotary controller.

11. The system according to claim 1, wherein each haptic profile comprises at least one notch, a first haptic profile comprising at least one first notch distinct from at least one second notch of a second haptic profile.

12. The system according to claim 11, wherein the first haptic profile comprises a first series of successive notches, the second haptic profile comprising a second series of successive notches of profiles and/or intensity distinct from the notches of the first series.

13. A control set of an aircraft, including:
a display, positioned in the cockpit of the aircraft;
the interface system according to claim 1;
an avionics unit configured to interact with airplane systems, the interface system being configured to communicate with said avionic unit for determining the current system and/or man-machine interface states of the aircraft.

14. An interaction method between a user and a display of an aircraft, comprising the following steps:
providing the interface system according to claim 1;
in a first system and/or man-machine interface state of the aircraft, driving into rotation of the rotary controller by a user, the haptic feedback generator generating a first haptic profile on the rotary controller; and
in a second system and/or man-machine interface state of the aircraft, driving into rotation of the rotary controller by a user, the haptic feedback generator generating a second haptic profile on the rotary controller.

15. The method according to claim 14, wherein the steps of driving into rotation of the rotary controller by a user in the first system and/or man-machine interface state of the aircraft and in the second system and/or man-machine interface state of the aircraft cause interaction of the target with the same field on the display.

16. The system according to claim 1, wherein the field is an input field of a set value of a flight parameter, a value of the set value being modified by rotating the rotary member;
the distinct man-machine interface states including distinct input interface states which comprise distinct speeds of rotation of the rotary controller, the distinct speeds of rotation being at least comprised in a first range of speeds of rotation greater than a predetermined speed of rotation, or in a second range of speeds of rotation less than a predetermined speed of rotation;
the set value being modified with a first increment when the speed of rotation of the rotary controller is comprised in the first range, or with a second increment when the speed of rotation of the rotary controller is comprised in the second range;
the haptic feedback generator being configured to generate a first haptic profile at a speed of rotation of the rotary controller comprised in the first range, and a second haptic profile distinct from the first haptic profile at a speed of rotation of the rotary controller comprised in the second range.

17. The system according to claim 1, wherein the field is an input field of a set value of a flight parameter, a value of the set value being modified by rotating the rotary member;
the distinct man-machine interface states of the aircraft comprising an indication of the type of input mode and/or of scale selected into which the set value has to be inputted;
the haptic feedback generator being configured to generate a first haptic profile when the indication corresponds to a first type of input mode and/or of scale, and a second haptic profile distinct from the first haptic profile when the indication corresponds to a second type of input mode and/or of scale.

18. The system according to claim 17, wherein the first and second input modes and/or scales are distinct units of the flight parameter.

19. An interface system between a user and a display of an aircraft, comprising:
a rotary controller configured to control a target on the display;
a target manager, controlled by the rotary controller for moving the target on the display during the rotation of the rotary controller and/or for interacting with a field targeted by the target during the rotation of the rotary controller;

a haptic feedback generator on the rotary controller during its rotation, the haptic feedback generator being configured to generate at least two distinct haptic profiles on the rotary controller depending on distinct system states and/or distinct man-machine interface states of the aircraft, wherein when the target is positioned on a control, displayed on the display and which may be actuated by the user for controlling or tracking an airplane system, the distinct system states comprise a normal operating state of the airplane system affected by the control and/or of the aircraft and a degraded operating state of the airplane system affected by the control and/or of the aircraft, the haptic feedback generator being configured to generate a first haptic profile in the normal operating state, the first haptic profile comprising at least one first notch, and being configured to generate a second haptic profile in the degraded operating state, the second haptic profile comprising at least one second notch having a smaller intensity than the first notch of the first haptic profile.

20. The system according to claim 19, wherein the control displayed on the display and which may be actuated by the user is an instruction for opening or closing pumps, actuators, mechanical, electrical and/or hydraulic circuits.

* * * * *